(12) United States Patent
Cray et al.

(10) Patent No.: US 9,562,149 B2
(45) Date of Patent: Feb. 7, 2017

(54) SILICONE RELEASE COATING COMPOSITIONS

(75) Inventors: Stephen Cray, South Glamorgan (GB); Jean De La Croix Habimana, Chaussée d'Ecaussinnes (BE); David Rich, Midland, MI (US); Marc Thibaut, Chapellez lez Herlaimont (BE)

(73) Assignee: DOW CORNING CORPORATION, Midland, MI (US)

( * ) Notice: Subject to any disclaimer, the term of this patent is extended or adjusted under 35 U.S.C. 154(b) by 2027 days.

(21) Appl. No.: 12/377,508

(22) PCT Filed: Aug. 2, 2007

(86) PCT No.: PCT/EP2007/058022
§ 371 (c)(1),
(2), (4) Date: Jun. 16, 2010

(87) PCT Pub. No.: WO2008/019953
PCT Pub. Date: Feb. 21, 2008

(65) Prior Publication Data
US 2010/0255205 A1    Oct. 7, 2010

(30) Foreign Application Priority Data
Aug. 14, 2006 (GB) .................................. 0616021.2

(51) Int. Cl.
C08G 77/12 (2006.01)
C08K 5/541 (2006.01)
C08L 83/06 (2006.01)
C09D 183/06 (2006.01)

(52) U.S. Cl.
CPC ................ *C08K 5/541* (2013.01); *C08L 83/06* (2013.01); *C09D 183/06* (2013.01)

(58) Field of Classification Search
CPC .......... C08K 5/541; C08L 83/06; C08L 83/04; C08L 83/00; C09D 183/06
USPC ........................................................ 427/386
See application file for complete search history.

(56) References Cited

U.S. PATENT DOCUMENTS

| | | | |
|---|---|---|---|
| 4,082,726 A | 4/1978 | Mine et al. | |
| 4,087,585 A | 5/1978 | Schulz | |
| 5,744,507 A | 4/1998 | Angell et al. | |
| 6,077,892 A * | 6/2000 | Feng et al. | 524/114 |
| 6,124,407 A | 9/2000 | Lee et al. | |
| 6,172,252 B1 | 1/2001 | Amako et al. | |
| 6,369,185 B1 | 4/2002 | Amako et al. | |
| 6,551,676 B1 | 4/2003 | Yamakawa et al. | |
| 6,603,014 B1 | 8/2003 | Habeck et al. | |
| 6,806,339 B2 * | 10/2004 | Cray et al. | 528/15 |
| 7,045,586 B2 | 5/2006 | Ahn et al. | |
| 7,090,923 B2 | 8/2006 | Griswold et al. | |
| 7,291,671 B2 | 11/2007 | Fukui | |
| 7,521,125 B2 | 4/2009 | Ahn et al. | |
| 2003/0088042 A1 | 5/2003 | Griswold et al. | |
| 2004/0254274 A1 | 12/2004 | Griswold | |
| 2005/0038188 A1 | 2/2005 | Ahn et al. | |
| 2005/0053793 A1 | 3/2005 | Benay-Oun et al. | |
| 2008/0262157 A1 | 10/2008 | Nakata et al. | |

FOREIGN PATENT DOCUMENTS

| | | |
|---|---|---|
| EP | 0556023 A1 | 8/1993 |
| EP | 1070734 A2 | 1/2001 |
| JP | 52-024258 | 2/1977 |
| JP | 62240363 | 4/1986 |
| JP | 2000-096005 A | 4/2000 |
| JP | 2000-119627 A | 4/2000 |
| JP | 2000-129132 A | 5/2000 |
| JP | 2000-281686 A | 10/2000 |
| JP | 2000-345046 A | 12/2000 |
| JP | 2001019627 | 1/2001 |
| JP | 2004-262972 A | 9/2004 |
| JP | 2006-002093 A | 1/2006 |
| JP | 2006-519893 A | 8/2006 |
| JP | 2007-502346 A | 2/2007 |
| WO | WO 03035781 A1 | 5/2003 |
| WO | WO 2004046267 A2 | 6/2004 |
| WO | WO 2005000983 A2 | 1/2005 |
| WO | 2005123839 | 12/2005 |

OTHER PUBLICATIONS

English language abstract for WO 03035781 extracted from espacenet.com database, dated Jun. 9, 2009.
PCT International Search Report for PCT/EP2007/058022 dated Nov. 6, 2007, 3 pages.
English language abstract for JP 52-024258 extracted from the PAJ database on Oct. 12, 2012, 9 pages.
English language abstract for JP 2000-096005 extracted from the espacenet.com database on Oct. 12, 2012, 9 pages.
English language abstract and machine-assisted English translation for JP 2000-119627 extracted from the PAJ database on Oct. 12, 2012, 44 pages.
English language abstract for JP 2000-129132 extracted from the espacenet.com database on Oct. 12, 2012, 12 pages.
English language abstract and machine-assisted English translation for JP 2000-281686 extracted from the PAJ database on Oct. 12, 2012, 46 pages.

(Continued)

*Primary Examiner* — Robert S Walters, Jr.
(74) *Attorney, Agent, or Firm* — Howard & Howard Attorneys PLLC

(57) ABSTRACT

A release coating composition is prepared comprising a polyorganosiloxane (A) having alkenyl groups, a crosslinking agent (B) having organohydrogensiloxane groups, a catalyst for the hydrosilylation reaction between (A) and (B), and an anchorage additive for enhancing the adhesion of the composition to a polymer film substrate. The anchorage additive is the reaction product of a fluid polyorganosiloxane (C) containing at least one alkenyl group and at least one silanol group with a hydrolysable silane (D) containing at least one epoxide group. The curable silicone release coating composition can be applied to a substrate known as a 'liner' retaining a label, which liner can for example be paper or a polymer film, and cured.

18 Claims, No Drawings

(56) References Cited

OTHER PUBLICATIONS

English language abstract and machine-assisted English translation for JP 2000-345046 extracted from the PAJ database on Oct. 12, 2012, 53 pages.
English language abstract and machine-assisted English translation for JP 2004-262972 extracted from the PAJ database on Oct. 12, 2012, 70 pages.
English language abstract for JP 2006-002093 extracted from the espacenet.com database on Oct. 12, 2012, 16 pages.
English language abstract not available for JP 2006-519893; however, see English language equivalent U.S. Pat. No. 7,090,923. Original Document extracted from the espacenet.com database on Oct. 12, 2012, 26 pages.
English language abstract not available for JP 2007-502346 extracted from the espacenet.com database on Oct. 12, 2012, 40 pages.

* cited by examiner

SILICONE RELEASE COATING COMPOSITIONS

RELATED APPLICATIONS

This application claims priority to and all the advantages of International Patent Application No. PCT/EP2007/058022, filed on Aug. 2, 2007, which claims priority to Great Britain Patent Application No. GB 0616021.2, filed on Aug. 14, 2006.

This invention relates to curable silicone release coating compositions. Silicone based release coatings are useful in applications where relatively non-adhesive surfaces are required. The curable silicone release coating composition is applied to a substrate known as a 'liner', which can for example be paper or a polymer film, and cured. Single-sided liners, for example, backing sheets for pressure sensitive adhesive labels, are used to temporarily retain the labels without affecting the adhesive properties of the labels. Double-sided liners, for example interleaving papers for double-sided and transfer tapes, are used to ensure the protection and desired unwind characteristics of a double-sided self-adhesive tape or adhesive film. The release coating is required to adhere well to the liner while having relatively low adhesion to the adhesive so that the label can be removed from the liner by a predetermined peel force. The present invention relates to curable silicone release coating compositions which adhere well to a wide variety of liner substrates, and in particular have improved adhesion to polymer substrates such as polyester films.

A liner substrate is coated by applying a silicone based release coating composition onto the substrate and subsequently curing the composition. The preferred curing mechanism is thermally initiated hydrosilylation, which can readily be modified to vary the adhesive force between the release coating and the adhesive label. The basic constituents of silicone based release coating compositions which are cured by hydrosilylation are (A) a polyorganosiloxane containing alkenyl groups, (B) a cross-linking agent containing organohydrogensiloxane groups and a catalyst for the hydrosilylation reaction between (A) and (B).

The liner substrate to which the release coating is applied is usually paper, but there is an increasing requirement for release coating of polymer substrates such as polyester, for example polyethylene terephthalate, film, polypropylene or polyethylene, particularly for clear on clear labels. Although the smooth surface of films has desired benefits in reduced transfer of adhesive patterns to the label, the use of film substrates, in particular unprimed polyester film, has the disadvantage of showing greater tendency of the silicone to rub off over time. After a few days at room temperature, the silicone layer may become easily removed from the polymeric film by simply rubbing with a finger. The use of polyethylene, polypropylene and polyester film liners has led to the need to design silicone release coatings with improved anchorage and delayed rub-off performance.

WO-A-2004/046267 describes a release coating composition comprising a siloxane (A) having alkenyl groups, a crosslinking agent (B) having organohydrogensiloxane groups and a catalyst for the hydrosilylation reaction between (A) and (B), additionally containing a polydiorganosiloxane of viscosity 10-200000 mPa·s at 25° C. consisting essentially of diorganosiloxane units of the formula —(SiR$_2$—O)— in which each R group is an alkyl group having 1 to 4 carbon atoms, to improve anchorage of the release coating on polymer film. The composition may contain a further adhesion improving additive such as an epoxysilane, a silanol-terminated polydiorganosiloxane containing at least one alkenyl group, or a melamine resin.

US-A-2003/0088042 describes a release coating composition, comprising (A) an anchorage additive which is the reaction product of a vinyl alkoxysilane, an epoxy-functional alkoxysilane, a catalyst and water, (B) an alkenyl silicone, (C) a hydrogen siloxane, (D) a hydrosilylation catalyst and (E) a cure inhibitor.

US-A-2004/0254274 and corresponding WO-A-2005/000983 describes additives for improved anchorage of silicone pressure sensitive adhesive composition coatings comprising $(R_a SiO_{(4-a)/2})_n$ where n is an integer greater than 3, a is from 1 to 3, R is a silicon-hydride and or an alkylenealkoxysilyl containing organic radical, with at least one silicon-hydride and one alkylenealkoxysilyl containing radical being present on the molecule. US2005/0038188A1 describes a composition prepared by mixing components comprising: (I) a polyorganosiloxane having an average of at least two unsaturated organic groups per molecule, optionally (II) an organohydrogenpolysiloxane having an average of at least two silicon-bonded hydrogen atoms per molecule, (III) a hydrosilylation catalyst; (IV) a fluoroorganosilicone; and (V) an adhesion promoter. Components (I) and (II) are free of fluorine atoms. Component (IV) has at least one functional group reactive with component (I), component (II), or both. When component (II) is not present, the component (IV) has an average of at least two silicon-bonded hydrogen atoms per molecule. Components (IV) and (V) are present in amounts sufficient to improve resistance to Bleed. Component (V) may comprise an epoxy-functional siloxane such as a physical blend or a reaction product of a hydroxy-terminated polyorganosiloxane with an epoxy-functional alkoxysilane. The compositions are adhesives and are used as die attach adhesives used in electronic applications. These compositions contain fillers, typically 1% by weight fumed silica treated with hexamethyldisilazane and 60% by weight of spherical fused silica.

EP 0 556 023 A1 describes epoxy methylsiloxanes as anchorage additives for heat curable solventless addition cured paper release compositions resulting from platinum catalyzed hydrosilation of alkenyl siloxanes and silicon hydride siloxanes.

WO2003/035781 describes a liquid silicone formulation, for use as a coating base for high-speed production of crosslinked release and water repellent elastomer coating on a solid support, which comprises at least a crosslinkable polyorganosiloxane POS (I), (SiVi-type POS and SiH-type POS); at least a (platinum-based) catalyst (ii); optionally an adherence modulator system (III); an adherence promoter (IV) comprising an epoxidized alkoxysilane and/or an alkenylated alkoxysilane, as well as a metal chelate and/or a metal alkoxide (GLYMO/MEMO/TiO4Bu).

There is a need for release coating compositions comprising an anchorage additive that shows more reliable adhesion of curable silicone release coating compositions onto all substrates, especially polymer films including commercial unprimed polyester with or without preliminary surface treatment.

A release coating composition according to the invention comprises a polyorganosiloxane (A) having alkenyl groups, a crosslinking agent (B) having organohydrogensiloxane groups, a catalyst for the hydrosilylation reaction between (A) and (B), and an anchorage additive for enhancing the adhesion of the composition to a polymer film substrate, characterised in that the anchorage additive is the reaction product of a fluid polyorganosiloxane (C) containing at least one alkenyl group and at least one silanol group with a hydrolysable silane (D) containing at least one epoxide group.

The invention includes a process for providing a release coating to a polymer film comprising applying to the polymer film a composition comprising a polyorganosiloxane (A) having alkenyl groups, a crosslinking agent (B) having organohydrogensiloxane groups, a catalyst for the hydrosilylation reaction between (A) and (B) and an anchorage additive for enhancing the adhesion of the composition to the polymer film and heating the coated film to cure the release coating, characterised in that the anchorage additive is the reaction product of a fluid polyorganosiloxane (C) containing at least one alkenyl group and at least one silanol group with a hydrolysable silane (D) containing at least one epoxide group.

According to a further aspect, the invention includes the use of the reaction product of a fluid polyorganosiloxane (C) containing at least one alkenyl group and at least one silanol group with a hydrolysable silane (D) containing at least one epoxide group in a release coating composition comprising a polyorganosiloxane (A) having alkenyl groups, a crosslinking agent (B) having organohydrogensiloxane groups and a catalyst for the hydrosilylation reaction between (A) and (B) as an anchorage additive for enhancing the adhesion of the composition to a polymer film substrate.

The siloxane (A) is an organopolysiloxane having at least two silicon-bonded alkenyl-functional groups per molecule. The alkenyl group is preferably linear having up to 6 carbon atoms, as exemplified by hexenyl, vinyl, allyl or pentenyl, or may be cycloalkenyl such as cyclohexenyl.

(A) can for example be a linear organopolysiloxane having the general formula $$YX_2SiO(X_2SiO)_x(XZSiO)_ySiX_2Y$$

wherein each X denotes independently a phenyl group or an alkyl or cycloalkyl group having from 1 to 10 carbon atoms, for example, methyl, ethyl, propyl, butyl or cyclohexyl; each Y and Z denotes an alkenyl group; and X and Y are such that (A) has a viscosity at 25° C. is in the range from 50 to 5000 mm²/s, most preferably 200 to 500 mm²/s. At least 90% of all the X substituents of (A) are preferably methyl groups, most preferably all being methyl groups. It is preferred that no more than 4% of all units of (A) organopolysiloxane are units with an alkenyl group, as otherwise there is the possibility of crosslinking the release coating composition too much upon curing. Preferably y=0. It is possible but not preferred that small amounts (preferably less than 2% of all the substituents present) of other substituents are present, for example hydroxyl groups.

One preferred siloxane (A) is a branched siloxane comprising one or more Q units of the formula (SiO$_{4/2}$), from 15 to 995 D units of the formula R$^b$$_2$SiO$_{2/2}$ and M units of the formula R$^a$R$^b$$_2$SiO$_{1/2}$, wherein the R$^a$ and R$^b$ substituents are selected from alkyl and alkenyl groups having 1 to 6 carbon atoms, at least three R$^a$ substituents in the branched siloxane being alkenyl units, as described in EP-A-1070734. Such a siloxane may for example be a poly(dimethylsiloxane-silicate) copolymer having at least three vinyldimethylsilyl-terminated siloxane branches. The branched siloxane can also incorporate other terminal groups such as terminal trimethylsilyl (SiMe$_3$) and/or terminal hydroxydimethylsilyl (SiMe$_2$OH) groups. This so-called Q branched siloxane can contain other additional branching groups, for example it can also incorporate T$^{vi}$ units, of the formula ViSiO$_{3/2}$ where Vi denotes a vinyl group, within the chain without affecting the anchorage. Branched siloxanes have the advantage that they allow faster cure than linear polymers with similar viscosities. Release coating compositions based on such branched siloxanes develop good anchorage when combined with the anchorage additives of this invention.

The organohydrogenpolysiloxane crosslinking agent (B) generally contains at least three Si—H groups and may have the general formula:—

$$R^t{}_3SiO_{1/2}((CH_3)_2SiO_{2/2})_d(R^t{}_2SiO_{2/2})_e)SiO_{1/2}R^t{}_3$$

where each R$^t$ may be an alkyl group having 1 to 4 carbon atoms or hydrogen, d is 0 or an integer, e is an integer such that d+e is from 8 to 400. Alternatively the cross-linking agent may be an MQ resin consisting of units of the general formula SiO$_{4/2}$ and R$^q$$_3$SiO$_{1/2}$ wherein at least three R$^q$ substituents are hydrogen atoms and the remainder are alkyl groups, or may be a rake or comb polymer comprising a polydiorganosiloxane chain containing one or more T (having the general formula R$^b$SiO$_{3/2}$) or Q units having a subchain of diorganosiloxane units attached thereto via oxygen. It is preferred that the hydrosiloxane crosslinker has a viscosity of from 5 to 1000 mm²/s at 25° C., more preferably 20 to 350 mm²/s, most preferably 50 to 300 mm²/s. The crosslinking agent (B) is preferably present in an amount such that the molar ratio of the total number of Si—H groups in the release coating composition to alkenyl groups in the composition is from 0.9:1 to 8:1, more preferably 1.1:1 to 4:1, most preferably 1.5:1 to 3:1.

Suitable hydrosilylation catalysts include complexes or compounds of group VIII metals, for example, platinum, ruthenium, rhodium, palladium, osmium and indium. Preferred catalysts are platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, PtCl$_2$.PtCl$_3$ and Pt(CN)$_3$. Alternatively the catalyst may be a rhodium complex, for example, RhCl$_3$(Bu$_2$S)$_3$. The catalyst is typically used at 40 to 250 parts per million by weight platinum (or other group VIII metal) based on the weight of the release coating composition.

The fluid polyorganosiloxane (C) used in the preparation of the anchorage additive generally contains at least one alkenyl group and at least one silanol group. The polyorganosiloxane (C) generally contains a chain of at least 3 siloxane units and is preferably a substantially linear polydiorganosiloxane. The polyorganosiloxane (C) preferably has a degree of polymerisation of at least 4 and preferably at least 6 siloxane units up to 30, 50 or 100 siloxane units. The polyorganosiloxane (C) can for example have a viscosity in the range 2 to 200 mm²/s at 25° C. The alkenyl group can for example have from 2 to 6 carbon atoms, for example a vinyl or 5-hexenyl group. The polyorganosiloxane (C) usually also contains alkyl groups, particularly alkyl groups having 1 to 4 carbon atoms such as methyl or ethyl groups and may contain aryl groups such as phenyl. The alkenyl groups can be present as pendant groups, for example the copolymer (C) can be a polymethylvinylsiloxane, or a copolymer of methylvinylsiloxane units and dimethylsiloxane units, or a copolymer of divinylsiloxane units and dimethylsiloxane units. Alternatively or additionally the alkenyl groups can be present as terminal groups, for example in methylvinylsilanol terminal units. The silanol groups are preferably present in terminal units such as dimethylsilanol or methylvinylsilanol terminal units. Most preferably the polyorganosiloxane (C) is a polydiorganosiloxane having terminal silanol groups at both ends of the siloxane chain, although part or all of the polyorganosiloxane (C) may have one silanol end group and one Si-alkoxy end group, for example a dimethylmethoxysilyl end unit. The polyorganosiloxane (C) can for example be formed by the reaction of methylvinyldimethoxysilane and dimethyldimethoxysilane in the presence of a silane hydrolysis catalyst such as a base or an acid.

The hydrolysable silane (D) which is reacted with the polyorganosiloxane (C) to form the anchorage additive generally contains at least one epoxide group per molecule. The epoxide group can for example be present as a glycidyl group or a 3,4-epoxycyclohexyl group. The silane (D) can for example be of the formula $(R^*)_e(R'')_f Si(OA)_{(4-e-f)}$, where R* represents a substituted alkyl group containing an epoxide group, R" represents an alkyl group preferably having 1 to 6 carbon atoms such as a methyl or ethyl group, A represents an alkyl group having 1 to 4 carbon atoms such as a methyl or ethyl group, e is 1, 2 or 3, most preferably 1, and f is 0, 1 or 2, most preferably 0 or 1. The group R* can for example be a 3-glycidoxypropyl, glycidyl, 5,6-epoxyhexyl, 3,4-epoxycyclohexyl, 2-(3,4-epoxycyclohexyl)ethyl, 3-(3,4-epoxycyclohexyl)propyl or 3,4-epoxycyclohexylmethyl group. Examples of suitable hydrolysable silanes (D) include 3-glycidoxypropyltrimethoxysilane, 3-glycidoxypropyltriethoxysilane, methyl(3-glycidoxypropyl)dimethoxysilane, methyl(3-glycidoxypropyl)diethoxysilane, 2-(3,4-epoxycyclohexyl)ethyltrimethoxysilane and 3-(3,4-epoxycyclohexyl)propyltrimethoxysilane.

The fluid polyorganosiloxane (C) and the hydrolysable silane (D) can be reacted at elevated temperature and/or in the presence of a silanol condensation catalyst. The catalyst can for example be a base such as potassium hydroxide, sodium hydroxide, potassium silanolate or a phosphazene base, or can be an acid such as HCl, or can be a titanate ester or an organic compound of tin. The temperature of reaction is preferably in the range 50 to 150° C. The novel anchorage additive thus prepared generally contains at least one epoxy group, at least one alkenyl group and at least one alkoxy group in its molecule.

The fluid polyorganosiloxane (C) and the hydrolysable silane (D) are preferably reacted at 0.5 to 1.5 moles silane (D) per silanol group of fluid polyorganosiloxane (C). The weight ratio of fluid polyorganosiloxane (C) to hydrolysable silane (D) will vary according to the chain length of fluid polyorganosiloxane (C), but is usually in the range 25:75 to 95:5, particularly 40:60 to 90:10

The fluid polyorganosiloxane (C) and the hydrolysable silane (D) can if desired be co-reacted with a dialkyldialkoxysilane such as dimethyldimethoxysilane and/or with an alkenyl dialkoxysilane such as methylvinyldimethoxysilane. Such a diorganodialkoxysilane reacts as a chain extender for the siloxane chains of the fluid polyorganosiloxane (C) while still allowing reaction with the epoxy functional hydrolysable silane (D).

The extent of reaction between the fluid polyorganosiloxane (C) and the hydrolysable silane (D) is preferably sufficient that at least 50%, and preferably at least 80%, of the hydrolysable epoxy-functional silane (D) is present in the anchorage additive as reaction product rather than as unreacted silane. We have found that the reaction product when used as anchorage additive has better compatibility with the other components of the silicone release coating than the hydrolysable epoxy-functional silane (D) and (whether or not (D) is used with additional hydrolysable vinyl silane or siloxane) leads to more consistent anchorage to polymer film substrates. The hydrolysable epoxy-functional silane (D) has some tendency to self-condense when the silicone release coating composition is cured, forming siloxane resin of reduced compatibility with the cure product of polyorganosiloxane (A) and crosslinking agent (B).

We believe that the presence in the reaction product of siloxane chains derived from the fluid polyorganosiloxane (C) leads to better compatibility with the other components of the silicone release coating and may give more consistent anchorage to polymer film substrates than a reaction product of the hydrolysable epoxy-functional silane (D) with a vinyltrialkoxysilane.

The anchorage additive is preferably present in the release coating at 0.1 to 20% by weight of the siloxane content of the coating, for example at 0.5 to 5 or 10% by weight.

The release coating composition is preferably substantially solventless, but can alternatively be a solution in an organic solvent, for example a solution in a hydrocarbon solvent such as xylene or toluene, or an aqueous emulsion stabilised by a nonionic, anionic or cationic surfactant. A solution or emulsion can for example have a concentration of for example 4 to 50% by weight. Preferably the release coating composition has a viscosity of not less than 50 mm²/s and not more than 10000 mm²/s at 25° C.; more preferably the viscosity is from 50 to 1000 mm²/s.

The composition may additionally comprise one or more cure inhibitors adapted to prevent the cure of the coating composition from occurring below a predetermined temperature. A cure inhibitor may be effective to delay or prevent the room temperature cure of the silicone composition to provide a long coating operation time without compromising the cure rate at elevated temperature. Such an inhibitor is often used in silicone release coatings which cure by hydrosilylation and may be used in the compositions according to the present invention, although an inhibitor may not be necessary at the lower levels of platinum metal catalyst. The inhibitor can be any material that is known to be, or can be, used to inhibit the catalytic activity of platinum group metal-containing catalysts. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines. [0016] Typical inhibitors include acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl (3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, 2-methoxy-1-methylethylmaleate; and a fumarate/alcohol mixture wherein the alcohol is, for example, benzyl alcohol or 1-octanol and ethenyl cyclohexyl-1-ol, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above. Typically the inhibitors are diallyl maleate, bis-2-methoxy-1-methylethyl maleate, 1-ethynyl-1-cyclohexanol, and 3,5-dimethyl-1- hexyn-3-ol. If used, an inhibitor can for example be used at 0.1 to 3% by weight of the release coating composition.

The release coating composition may contain a release modifier in order to control (increase) the level of release force (the adhesive force between the release coating and the adhesive label). Release coating compositions having the required release force can be formulated from a premium (modifier-free) release coating composition by adjusting the level of modifier. The release modifier is usually packaged as a separate component so that the amount of modifier added to the release coating composition can be controlled. The release modifier package may also contain the anchorage additive reaction product of (C) and (D). Any appropriate silicone release modifier may be used. Examples include an alkenylated silicone resin, an alkenylated polydiorganosiloxane, one or more primary alkenes containing from 12 to 30 carbon atoms, and/or one or more branched alkenes containing at least 10 carbon atoms. If used, a release modifier can for example be used at up to 85% by weight, often 25 to 85%, based on the polyorganosiloxane (A).

Other constituents which may also be added to release coating compositions of the present invention include, for example, bath life extenders such as an alcohol, reactive diluents, fragrances, preservatives and fillers, for example, silica, quartz or chalk.

The release coating composition according to the invention preferably is free of filler or contains only a limited amount of filler, typically from 0 to 30% by weight of the composition. Fillers can agglomerate or otherwise stick to the coater equipment used to apply the release coating. They can hinder optical properties, for example transparency, of the release coating and of the final label. The fillers may be prejudicial to the adherence of the label.

A release coating composition according to the invention preferably comprises a polyorganosiloxane (A) having alkenyl groups, a crosslinking agent (B) having organohydrogensiloxane groups, a catalyst for the hydrosilylation reaction between (A) and (B), an anchorage additive for enhancing the adhesion of the composition to a polymer film substrate, and from 0 to 30% by weight of the composition is formed of spherical fused silica, characterised in that the anchorage additive is the reaction product of a fluid polyorganosiloxane (C) containing at least one alkenyl group and at least one silanol group with a hydrolysable silane (D) containing at least one epoxide group. Preferably, the composition contains less than 25%, less than 10%, less than 5%, preferably less than 1% of spherical fused silica. Preferably, the composition contains no or less than 25%, less than 10%, less than 5%, preferably less than 1% of filler.

The release coating composition of the invention is preferably free from fluoroorganosilicone compound. It is believed that, during the cure, a fluorocompound, because of its low surface tension, will rapidly migrate to the interface coating/substrate, for example a PET film/silicone coating interface, and prevent bleeding by making a fluorine containing barrier. By making a barrier, it prevents any component from reacting at the interface, thus if this system is used as release coating, the fluorocompound will pull the anchorage additive AA at the air/silicone interface instead of pulling it at the PET film/silicone interface. Even in case it could drag an anchorage additive to the right interface, it will make a barrier there, preventing further contact between AA and the film surface, impeding bonding the silicone coating to the polymer film substrate. Moreover, fluorosilicone compounds are usually expensive.

While release coating compositions of the present invention may be prepared by merely premixing the constituents together, it may be more desirable to prepare such compositions in separate parts or packages to be combined at the time the composition is applied as a coating. The packages can for example be:
(i) a first part comprising the alkenyl siloxane (A) and inhibitor, a second part comprising a release modifier and inhibitor, a third part comprising the catalyst and a fourth part comprising the cross-linking agent (B); or
(ii) a first part comprising the alkenyl siloxane (A) and catalyst, a second part comprising a release modifier and the catalyst and a third part comprising the cross-linking agent (B) and inhibitor.

The anchorage additive can be incorporated in any one or more of these packages or be added to the coating bath as a separate component. For example the anchorage additive can be mixed with the alkenyl siloxane (A) or can alternatively or additionally be mixed with the release modifier.

The release coating composition of the invention can be applied to any substrate but is particularly effective on substrates where anchorage is a problem, such as polymer film substrates, for example polyester, particularly polyethylene terephthalate (PET), polyethylene, polypropylene, or polystyrene films, including oriented and biaxially oriented films, for example biaxially oriented polypropylene. The release coating composition can alternatively be applied to a paper substrate, including plastic coated paper, for example paper coated with polyethylene, where anchorage may be a problem.

It may be preferred to expose a polymer film substrate to a corona discharge before the release coating is applied. Although the silicone release coating of the invention has improved anchorage even without corona discharge treatment, in certain instances the anchorage may be further improved if the film is corona treated before coating. Many customers for release coatings want to be able to coat any polyester film. For most polyester films, the silicone release coating of the invention has excellent anchorage even without corona discharge. Corona treatment in some cases will further improve the anchorage of the silicone coating to the substrate. The use of the anchorage additive of this invention avoids the need to treat a polyester film surface with primers before applying the release coating. Corona treatment can for example be carried out just before coating the film. The corona discharge station can be incorporated as a pretreatment in the film coating apparatus.

The release coating can for example be applied to the polymer substrate by spraying, doctor blade, dipping, screen printing or by a roll coater, e.g. an offset web coater, kiss coater or etched cylinder coater.

After application, the release coating is cured on the polymer film at a temperature of 70-180° C., preferably 100-160° C. The new anchorage additive does not affect the temperature at which the coating cures. Under production coater conditions cure can be affected in a residence time of 1 second to 6 seconds, preferably from 1.5 seconds to 3 seconds, at an air temperature of 120-150° C. Heating can be carried out in an oven, e.g. an air circulation oven or tunnel furnace or by passing the coated film around heated cylinders.

The invention is illustrated by the following detailed Examples, in which parts and percentages are by weight and all viscosities were measured at 25° C.

EXAMPLE 1

80% by weight of a silanol-terminated methylvinylsiloxane dimethylsiloxane copolymer with a viscosity of 20 mm$^2$/s, comprising mainly α,ω-hydroxy-terminated siloxane with some α-hydroxy-ω-methoxy-terminated siloxane, was reacted with 20% 3-glycidoxypropyltrimethoxysilane in the presence of potassium silanolate at 100° C. for an hour to produce a reaction product (ARP) containing at least one epoxy group, at least one alkenyl group and at least one alkoxy group in its molecule. At least 80% of the epoxy groups from the glycidoxypropyltrimethoxysilane were incorporated in the anchorage additive reaction product which also contained siloxane chains from the silanol-terminated polysiloxane.

A mixed trimethylsilyl, vinyldimethylsilyl-terminated poly(dimethylsiloxane-silicate) copolymer QBP of DP about 250 was mixed with diallyl maleate (DAM) inhibitor and ARP anchorage additive as described above. The resulting mix was then mixed with poly(methylhydrogen)siloxane crosslinker (MHS) and a hydrosilylation catalyst (CAT) which is the reaction product of chloroplatinic acid and divinyltetramethyldisiloxane (0.5% Pt).

The release coating composition thus produced was coated onto unprimed polyester film (sold under the Trade Mark TORAY TERPHANE 60.01) by a blade coater and oven cured at 140° C. for a dwell time of 3 seconds, and was laminated with an emulsion acrylic adhesive. Coating experiments were carried out both on film that had been corona treated (Example 1A) and on film that had not been corona treated (Example 1B).

The laminate was stored for 47 weeks and anchorage was tested by rubbing a finger firmly over the release coated film back and forth for 10 cycles, and determining if any of the coating had been damaged or removed. The results are listed in Table 1 as
N N N=No smear, no migration, no rub off
VSRO=Very slight rub off
SRO=Slight rub off
RO=Rub off
GRO=gross rub off In a comparative example, Example 1 was repeated replacing the anchorage additive ARP by a cold blend (CBL) of 80% silanol-terminated methylvinylsiloxane dimethylsiloxane copolymer used in Example 1 and 20% 3-glycidoxypropyltrimethoxysilane. The results of the comparative example are also shown in Table 1.

TABLE 1

|  | QBP | DAM | ARP | CBL | MHS | CAT | Rub-off |
|---|---|---|---|---|---|---|---|
| Ex1A | 96.4 | 0.60 | 3 |  | 4.16 | 2.4 | NNN |
| Ex1B | 96.4 | 0.60 | 3 |  | 4.16 | 2.4 | NNN |
| Comp ExA | 96.4 | 0.60 |  | 3 | 4.16 | 2.4 | RO |
| Comp ExB | 96.4 | 0.60 |  | 3 | 4.16 | 2.4 | GRO |

EXAMPLE 2

233 gr of trimethylsilyl, vinyldimethylsilyl-terminated poly(dimethylsiloxane-silicate) copolymer of viscosity 450 mP.s was blended with 10.8 gr poly(methylhydrogen)siloxane crosslinker MHS (SiH to vinyl molar ratio 3:1), 39.5 gr vinyl-functional silicone resin containing $SiO_{4/2}$ units as release modifier, 1.5 gr diallyl maleate, 7.1 gr of the catalyst CAT used in Example 1 giving a platinum level of 120 parts per million (ppm) and 5.2 gr of the anchorage additive ARP of Example 1.

After blending, the prepared release coating was coated on 'Toray Terphane 60.01' PET film of 30 micron using 3 rolls reverse gravure coating head at 18 m/min. It was cured for 3 sec at 140° C. using a 11 KW hot air drying oven. An acrylic emulsion adhesive sold by BASF under the Trade Mark V210 was coated over the cured silicone release coating using a bar coater and then dried at 150° C. for 30 sec in a static oven from Selecta. After drying, the siliconised, adhesive coated film was laminated with 50 micron PET sold under the Trade Mark 'Jindal 400' using a hot roll laminator from Chem. Instruments. The laminated samples were aged in a humidity chamber at 65° C./85% RH. The anchorage was measured by rubbing off the silicone with a finger. There was no rub-off initially, or after storage for 1, 2, 4, 8, 16 or 31 days.

EXAMPLES 3 TO 10 AND COMPARATIVE
EXAMPLES C2A TO C2D

Example 2 was repeated varying the amount of anchorage additive and/or catalyst in the release coating composition, and/or varying the SiH/vinyl ratio by varying the amount of crosslinker MHS, and/or varying the dwell time in the oven, as shown in Table 2. The coating procedure was also varied in that the film coated with release coating was treated in situ with 70 watt m$^{-2}$ min$^{-1}$ of corona discharge, and the cure temperature was 150° C. in all of Examples 3 to 10 and C2A to C2D.

TABLE 2

| Example | % Anchorage Additive | Dwell Time (s) | Platinum ppm | SiH/SiVi |
|---|---|---|---|---|
| 3 | 5 | 1.6 | 120 | 2 |
| C2A | 0 | 2.4 | 120 | 2 |
| C2B | 0 | 2.4 | 80 | 4 |
| 4 | 2.5 | 2 | 100 | 3 |
| 5 | 5 | 1.6 | 80 | 4 |
| 6 | 2.5 | 2 | 100 | 3 |
| C2C | 0 | 1.6 | 120 | 4 |
| 7 | 2.5 | 2 | 100 | 3 |
| 8 | 5 | 2.4 | 80 | 2 |
| 9 | 5 | 2.4 | 120 | 4 |
| C2D | 0 | 1.6 | 80 | 2 |
| 10 | 2.5 | 2 | 100 | 3 |

The anchorage levels of the release coatings of all of Examples 3 to 10 and C2 to C5 were measured by rubbing each film with a finger after 0, 2, 5, 7 and 14 days ageing. The results are shown in Table 3

TABLE 3

| | Days at 65° C./85% RH | | | | |
|---|---|---|---|---|---|
| Example | 0 | 2 | 5 | 7 | 14 |
| 3 | SRO | NNN | VSRO | NNN | VSRO |
| C2A | VSRO0 | GRO | GRO | GRO | GRO |
| C2B | NNN | GRO | GRO | GRO | GRO |
| 4 | NNN | NNN | NNN | NNN | NNN |
| 5 | SRO | SRO | VSRO | NNN | NNN |
| 6 | NNN | NNN | NNN | NNN | NNN |
| C2C | NNN | GRO | GRO | GRO | GRO |
| 7 | NNN | NNN | NNN | NNN | NNN |
| 8 | SRO | VSRO | VSRO | NNN | NNN |
| 9 | NNN | NNN | NNN | NNN | NNN |
| C2D | NNN | GRO | GRO | GRO | GRO |
| 10 | NNN | NNN | NNN | NNN | NNN |

Table 3 shows that the level of anchorage drops down rapidly when there is no anchorage additive in the formulation. All experiments containing the anchorage additive shows a stable anchorage over time. The effect of the anchorage additive overshadows the effect of SiH/SiVi ratio and of platinum catalyst level.

COMPARATIVE EXAMPLES C3 TO C10

Examples 3 to 10 were repeated using the blend CBL in place of the anchorage additive ARP used in Examples 3 to 10. The results are shown in Table 4.

TABLE 4

| Example | Days at 65° C./85% RH | | | | | |
|---|---|---|---|---|---|---|
| | 0 | 1 | 4 | 6 | 12 | 30 |
| C3 | NNN | VSRO | VSRO | NNN | VSRO | VSRO |
| C4 | VSRO | NNN | NNN | NNN | VSRO | RO |
| C5 | NNN | VSRO | GRO | GRO | GRO | GRO |
| C6 | NNN | NNN | NNN | GRO | GRO | GRO |
| C7 | VSRO | NNN | NNN | NNN | NNN | NNN |
| C8 | NNN | NNN | NNN | NNN | NNN | NNN |
| C9 | NNN | GRO | GRO | GRO | GRO | GRO |
| C10 | NNN | NNN | NNN | NNN | NNN | NNN |

Table 4 shows that when the cold blend of silanol-terminated methylvinylsiloxane dimethylsiloxane copolymer and glycidoxypropyltrimethoxysilane is used as anchorage additive, the stability of the anchorage depends on several factors including the SiH/SiVi ratio, platinum catalyst level and dwell time in the curing oven. Some formulations do not show a stable anchorage even with a high level of the blend CBL. Comparing Examples 3 to 10 to Comparative Examples 3 to 10, the blend CBL is not as robust as the reaction product anchorage additive ARP to maintain a high level of aged anchorage regardless of the SiH/SiVi ratio, platinum catlyst concentration and cure temperature/time.

EXAMPLE 11

96.4% by weight of the trimethylsilyl, vinyldimethylsilyl-terminated poly(dimethylsiloxane-silicate) copolymer QBP of Example 1 was mixed with 0.6% ethynyl cyclohexanol inhibitor and 3% of the anchorage additive ARP of Example 1. The resulting blend was mixed with sufficient poly(methylhydrogen)siloxane crosslinker MHS to give a SiH/Vi ratio of 2.6:1 and sufficient catalyst CAT to give 120 ppm platinum.

After blending, the prepared release coating was coated on 'Jindar' PET film of 30 micron using 3 rolls reverse gravure coating head at 18 m/min. It was cured for 30 sec at 150° C. After curing, a small part of the coating film was treated with methylisobutyl ketone solvent and the amount of coating dissolved (% extractables) was measured. The results are shown in Table 5 below.

BASF V210 acrylic emulsion adhesive was coated over the cured silicone release coating using a bar coater and then dried at 150° C. for 30 sec in a static oven. After drying, the siliconised, adhesive coated film was laminated with 50 micron Mark 'Jindal 400' PET using a hot roll laminator. Two laminated samples were aged in a humidity chamber at 50° C./70% $R^H$ for 20 days and then at 65° C./85% RH for 14 days. After this, the anchorage was measured by rubbing off the silicone with a finger. The results are shown in Table 5, using the same rating system as in Example 1.

EXAMPLE 12

80% by weight of a silanol-terminated methylvinylsiloxane dimethylsiloxane copolymer of viscosity 20 centiStokes comprising α,ω-hydroxy-terminated siloxane and α-hydroxy-ω-methoxy-terminated siloxane, was reacted with 20% methyl(3-glycidoxypropyl)diethoxysilane in the presence of potassium silanolate at 100° C. for an hour to produce a reaction product ARP2 containing at least one epoxy group, at least one alkenyl group and at least one alkoxy group in its molecule.

A release coating composition was prepared as described in Example 11, using ARP2 as anchorage additive in place of ARP.

COMPARATIVE EXAMPLE C12

A release coating composition was prepared as described in Example 11, using a cold blend of the silanol-terminated methylvinylsiloxane dimethylsiloxane copolymer of Example 12 and methyl(3-glycidoxypropyl)diethoxysilane in weight ratio 80:20 as anchorage additive in place of ARP.

EXAMPLE 13

50% by weight of a silanol-terminated methylvinylsiloxane dimethylsiloxane copolymer of viscosity 20 mm²/s, comprising α,ω-hydroxy-terminated siloxane and α-hydroxy-ω-methoxy-terminated siloxane, was reacted with 50% β-(3,4-epoxycyclohexyl)ethyltrimethoxysilane in the presence of potassium silanolate at 100° C. for an hour to produce a reaction product ARP3 containing at least one epoxy group, at least one alkenyl group and at least one alkoxy group in its molecule.

A release coating composition was prepared as described in Example 11, using ARP3 as anchorage additive in place of ARP.

COMPARATIVE EXAMPLE C13

A release coating composition was prepared as described in Example 11, using a cold blend of the silanol-terminated methylvinylsiloxane dimethylsiloxane copolymer of Example 13 and β-(3,4-epoxycyclohexyl)ethyltrimethoxysilane in weight ratio 50:50 as anchorage additive in place of ARP.

EXAMPLE 14

45.5% by weight of a silanol-terminated methylvinylsiloxane dimethylsiloxane copolymer of viscosity 20 mm²/s, comprising α,ω-hydroxy-terminated siloxane and α-hydroxy-Ω-methoxy-terminated siloxane, was reacted with 45.5% 3-glycidoxypropyltrimethoxysilane and 9% methylvinyldimethoxysilane in the presence of potassium silanolate at 100° C. for an hour to produce a reaction product ARP4 containing at least one epoxy group, at least one alkenyl group and at least one alkoxy group in its molecule.

A release coating composition was prepared as described in Example 11, using ARP4 as anchorage additive in place of ARP.

The release coating compositions of Examples 12 to 14 and Comparative Examples 12 and 13 were coated on PET film, cured and tested for extractables as described in Example 11. The results are shown in Table 5 below. The coated film was laminated and aged and tested for anchorage as described in Example 11, and these results are also shown in Table 5,

TABLE 5

| Example No. | % extractables | Anchorage test result |
| --- | --- | --- |
| 11 | 3.2 | NNN |
| 11 | 2.9 | NNN |
| C12 | 2.6 | GRO |
| C12 | 1.2 | GRO |
| 12 | 3.3 | NNN |
| 12 | 3.3 | NNN |
| C13 | 2.9 | GRO |
| C13 | 3.4 | GRO |
| 13 | 0.5 | NNN |
| 13 | 1.0 | NNN |
| 14 | 0.7 | NNN |
| 14 | 4.1 | NNN |

The invention claimed is:

1. A release coating composition comprising: a polyorganosiloxane (A) having alkenyl groups; a crosslinking agent (B) having organohydrogensiloxane groups; a catalyst for the hydrosilylation reaction between (A) and (B); an anchorage additive for enhancing the adhesion of the composition to a polymer film substrate, characterised in that the anchorage additive is the reaction product of a fluid polyorganosiloxane (C) containing at least one alkenyl group and at least one silanol group with a hydrolysable silane (D) containing at least one epoxide group; and a filler present from 0 to 30% by weight of the release coating composition, wherein the release coating composition is free from a fluoroorganosilicone compound.

2. A release coating composition according to claim 1, wherein the polyorganosiloxane (C) has a degree of polymerisation of 4 to 50 siloxane units.

3. A release coating composition according to claim 2, wherein the polyorganosiloxane (C) is a polydiorganosiloxane having terminal silanol groups.

4. A release coating composition according to claim 3, wherein the polyorganosiloxane (C) is a copolymer of methylvinylsiloxane units and dimethylsiloxane units.

5. A release coating composition according to claim 2, wherein the silane (D) comprises an (epoxy-substituted alkyl) di or trialkoxy silane.

6. A release coating composition according to claim 2, wherein the epoxide groups in the silane (D) are present as glycidyl groups.

7. A release coating composition according to claim 2, wherein the epoxide groups in the silane (D) are epoxycyclohexyl groups.

8. A release coating composition according to claim 1, wherein the polyorganosiloxane (C) is a polydiorganosiloxane having terminal silanol groups.

9. A release coating composition according to claim 8, wherein the polyorganosiloxane (C) is a copolymer of methylvinylsiloxane units and dimethylsiloxane units.

10. A release coating composition according to claim 1, wherein the silane (D) comprises an (epoxy-substituted alkyl) di or trialkoxy silane.

11. A release coating composition according to claim 1, wherein the epoxide groups in the silane (D) are present as glycidyl groups.

12. A release coating composition according to claim 1, wherein the epoxide groups in the silane (D) are epoxycyclohexyl groups.

13. A release coating composition according to claim 1, wherein the fluid polyorganosiloxane (C) and hydrolysable silane (D) are reacted in a weight ratio in the range 10:90 to 90:10.

14. A release coating composition according to claim 1, wherein the anchorage additive is the reaction product of the polyorganosiloxane (C), the silane (D) and a di(hydrocarbyl) dialkoxysilane in which each hydrocarbyl group is selected from alkyl and alkenyl groups.

15. A release coating composition according to claim 1, wherein the polyorganosiloxane (A) is a branched siloxane comprising one or more Q units of the formula ($SiO_{4/2}$), from 15 to 995 D units of the formula $R^b{}_2SiO_{2/2}$ and M units of the formula $R^aR^b{}_2SiO_{1/2}$, wherein the $R^a$ and $R^b$ substituents are selected from alkyl and alkenyl groups having 1 to 6 carbon atoms, at least three $R^a$ substituents in the branched siloxane being alkenyl units.

16. A release coating composition according to claim 1, wherein the composition further contains a cure inhibitor selected from ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles and diaziridines.

17. A release coating composition according to claim 1, wherein the anchorage additive is present at 0.5 to 10% by weight of the release coating composition.

18. A process for providing a release coating to a polymer film comprising:
applying to the polymer film a release coating composition comprising:
a polyorganosiloxane (A) having alkenyl groups; a crosslinking agent (B) having organohydrogensiloxane groups; a catalyst for the hydrosilylation reaction between (A) and (B); an anchorage additive for enhancing the adhesion of the release coating composition to the polymer film, wherein the anchorage additive is the reaction product of a fluid polyorganosiloxane (C) containing at least one alkenyl group and at least one silanol group with a hydrolysable silane (D) containing at least one epoxide group; a filler present from 0 to 30% by weight of the release coating composition; wherein the release coating composition is free from a fluoroorganosilicone compound;
and heating the applied release coating composition to cure the applied release coating composition.

* * * * *